INVENTORS
SAMUEL M. MILLS
KAREL HUSAR

BY *Raymond W. Colton*

ATTORNEY

3,367,816
METHOD OF HELICALLY WINDING COIL FORMS WHILE EXTRUDING MATERIAL ONTO THE INNER WALL

Samuel M. Mills, University Park, and Karel Husar, College Park, Md., assignors to Stone Straw Corporation, a corporation of New Jersey
Filed Dec. 27, 1963, Ser. No. 333,826
10 Claims. (Cl. 156—190)

This invention relates to methods of making helically wound tubes having plastic material extruded on their inner walls, and particularly to methods of making coil forms for permeability tuned inductances adapted to receive adjustable magnetic cores and maintain such cores in any adjusted position.

The methods heretofore employed in the production of such coil forms have applied preformed self-supporting filaments to the inner walls of tubes, lacking the required versatility inherent to the methods contemplated by the present invention.

In accordance with the present invention, the material applied to the inner walls of the tubes for engagement with the threads of the adjustable magnetic cores, can be varied in pitch, breadth, height, color, electrical properties and general configuration with a high degree of facility so as to satisfy the requirements of different users of the resulting coil forms with a minimum of inconvenience and at a reasonable cost.

It is among the objects of the present invention to provide a method of making a coil form comprising helically winding a flexible strip on a hollow mandrel, adhesively bonding convolutions of the strip together to produce a self-supporting tube, advancing the tube along the mandrel, and extruding a plastic composition under pressure through the mandrel into contact with inner wall portions of the tube as the tube advances with respect to the mandrel. The mandrel may be fixed and may be provided with any desired number of extrusion ports adjacent its unsupported end so that any desired number of extruded bodies can be deposited on the inner wall of the advancing tube. For a large number of applications, it is preferred that the strip be a polyester and that the extruded plastic material likewise be polyester.

In a preferred form of the invention, the plastic composition is extruded continuously while the tube advances so as to be helically deposited on the inner wall of the tube. A plurality of bodies of such plastic composition may be helically applied to the inner wall portions of the tube, and where color coding or identification of any type is desired, the extruded plastic composition can be pigmented or otherwise colored so as to provide contrast with the tube itself. After the tube is formed, it may be impregnated with a polyester or other protective material.

The strip used for the production of a coil form will be composed of an electrically insulating material, and the plastic composition extruded will preferably be settable, resilient and adhesive.

It is preferred that a plurality of such flexible insulating strips be wound in superimposed relationship to form a tube having multiple plies and staggered joints in the production of tubes to serve as coil forms in accordance with the present invention.

A more complete understanding of the invention will follow from a description of the accompanying drawings wherein.

Figure 1:
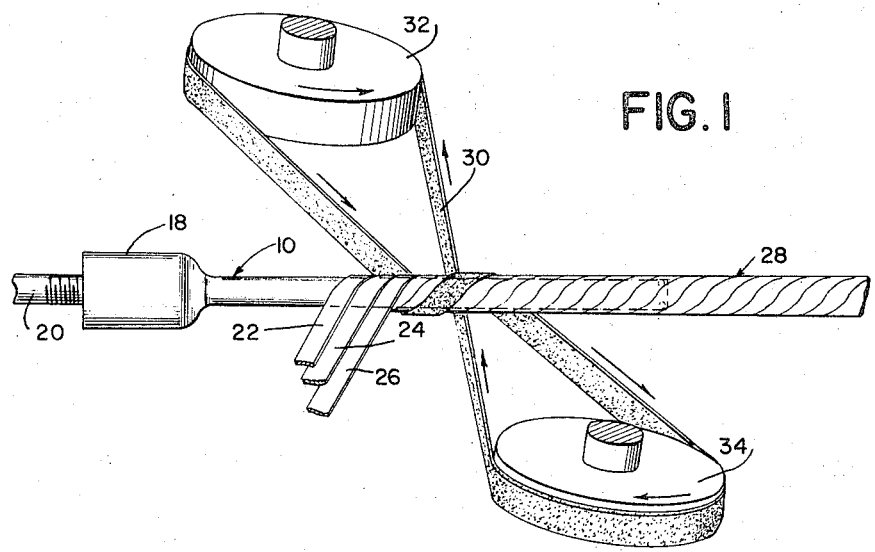
FIG. 1 is a somewhat diagrammatic representation of the manner in which three strips of material are wound upon a mandrel through which a plastic material is extruded upon the inner wall of the tube as it advances along the mandrel.
Figure 2:
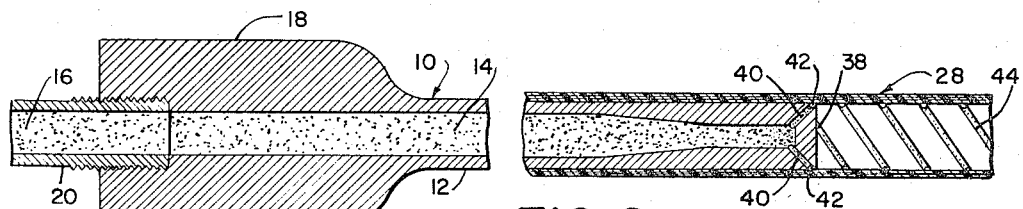
FIG. 2 is a fragmentary sectional elevation on an enlarged scale depicting the mandrel and tube of FIG. 1.

A mandrel 10 of tubular form is provided with an outer surface 12 on which a tube is to be wound and an inner passage 14 through which a composition 16 to be extruded is fed. The left end of the mandrel as viewed in the drawing is suitably supported and provided with an enlargement 18 into which a supply tube 20 is threaded for the introduction of the plastic material to be extruded from a suitable source, not shown.

Figure 3:
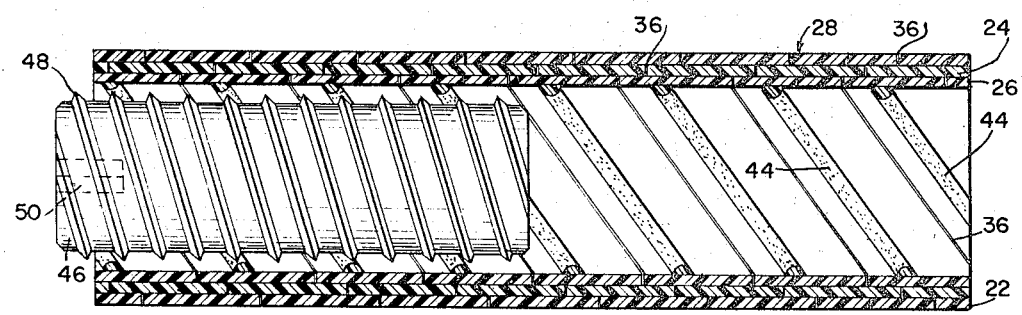
FIG. 3 is a sectional elevation on a further enlarged scale of a coil form according to the present invention into which a threaded magnetic core has been introduced.

The three strips 22, 24 and 26 shown in FIG. 1 as being wound upon the mandrel 10 in a conventional fashion to form a tube 28, are conformed to the periphery of the mandrel by means of a winding belt 30 wrapped about the strips and mandrel and driven by a driving wheel 32 in cooperation with an idler wheel 34. As best shown in FIG. 3, the strips are wound in superimposed relationship, each of the plies having its convolutions in abutting relationship, so that the joints 36 of successive plies will be in staggered relationship.

The right end of the mandrel 10 is provided with a substantially closed end wall 38 containing one or more passages 40 through which the plastic composition 16 is extruded, one or more delivery ports 42 being located at the intersection of the mandrel outer surface 12 and its end wall 38. Accordingly, as the tube advances relative to the mandrel, the plastic composition under pressure will be deposited on the inner wall of the tube to form one or more beads 44 adhering to the inner wall of the tube. Where the plastic composition is extruded continuously as the tube advances, the bead or beads will be helical and their pitch will correspond with that of the strips themselves.

It will be understood by those skilled in the art that the pitch and depth of the rib or bead 44 are variable so as to adapt the tube to cooperation with a wide variety of threaded cores. Moreover, by varying the composition of the extruded material, the resilience, flexibility, hardness and other characteristics of the bead will be capable of wide variation.

The strip material used in winding the tube is preferably produced from a polyester resin, but it may be composed of a wide variety of materials, preferably impervious to moisture and fungus growth and having electrical insulating properties. Various materials can be employed to form the bead, but here again polyester resins are preferred of the types exemplified by E. I. du Pont de Nemours & Company, Polyester Adhesive Series 4695, 4696 and 4697. Polyester adhesives of these same types can be used in bonding the strips themselves together, but it is preferable that different series be used for these two purposes so that when the bead is deposited, its solvent will not adversely affect the bond holding the convolutions together. In lieu of the preferred polyester adhesives, it is intended by the present invention that rubber, silicones, epoxy resins, urethanes, and other compositions be employed which can be catalyzed and/or set by means of heat to produce a rib or bead characterized by resilience, hardness, flexibility, tackiness, and above all, extrudability to a controlled degree.

The characteristics of the polyester adhesives employed can be controlled by the addition of a thickener such as "Cab-O-Sil," a sub-microscopic pyrogenic silica, available from Cabot Corporation, 125 High Street, Boston, Mass. A catalyst can also be incorporated in the polyester adhesives contemplated, such as a blocked isocyanate curing agent available from Du Pont and identified as RC-E-81955 or RC-805. Various other catalysts and contemplated which will produce the desired effects with the particular compositions undergoing extrusion.

The subsequent impregnation of the internally beaded tube can be effected with a polyester resin such as "Permafil," available from General Electric Company, in combination with an oxidizing catalyst such as tertiary butyl perbenzoate.

It will be understood that a suitable thickener incorporated in the composition to be extruded renders it extrudable and self-supporting and a suitable catalyst imparts cold setting properties. The subsequent impregnation renders the bead containing tube stronger to support a coil winding, improves its moisture resistance and also enhances its dielectric properties. A preferred polyester for use as the strip material is the well known "Dacron" which is a Class B material rated at a maximum temperature of 130° C. by varying the dimensions of the bead through the substitution of mandrels having different orifices 42, any desired torque and push-through values can be provided for a given magnetic core.

A magnetic core 46 having external threads 48 and a wrench socket 50 is depicted in FIG. 3 as having its threads engaging the bead or beads 44 carried by the inner wall of the tube 28. By virtue of the deformability and resilience of the composition defining the bead or beads, when the core is introduced into the tube and turned by means of a wrench, its threads 48 will form complementary threads in the bead or beads whose innermost portions lie in a cylinder of smaller diameter than a cylinder circumscribing the threads 48. Accordingly, a binding action between the core and bead material will result, preventing any accidental movement of the core relative to the tube, and maintaining any preset position of the core.

Whereas only one specific illustration of the invention has been described, the accompanying claims include within their scope such variations as will be suggested to those skilled in the art.

We claim:

1. A method of making an internally coated tube comprising helically winding a flexible strip on a hollow mandrel, adhesively bonding convolutions of said strip together to produce a self-supporting tube, advancing said tube along said mandrel, and extruding a plastic composition under pressure through said mandrel into adherent contact with inner wall portions of said tube as said tube advances with respect to said mandrel.

2. A method according to claim 1 wherein said strip is wound about a fixed mandrel.

3. A method according to claim 1 wherein said strip is a polyester.

4. A method according to claim 1 wherein said plastic composition is extruded continuously while said tube advances with respect to said mandrel.

5. A method according to claim 1 wherein a plurality of bodies of said plastic composition are extruded into contact with the inner wall portions of said tube.

6. A method according to claim 1 wherein said plastic composition is a polyester.

7. A method according to claim 1 wherein said plastic composition has a color contrasting with that of said tube.

8. A method according to claim 1 wherein said plastic composition is deposited helically on the inner wall of said tube.

9. A method according to claim 1 wherein said tube is subsequently impregnated with a polyester.

10. A method of making a coil form comprising helically winding a plurality of flexible insulating strips in superimposed relationship on a hollow mandrel, adhesively bonding convolutions of said strips together to produce a self-supporting tube, advancing said tube along said mandrel, and extruding a resilient adhesive plastic composition under pressure through said mandrel in the form of a helical bead adhering to the inner wall of said tube as said tube advances with respect to said mandrel.

References Cited

UNITED STATES PATENTS

| | | | |
|---|---|---|---|
| 2,321,738 | 6/1943 | Farny | 264 |
| 3,070,840 | 1/1963 | Mercer | 264—177 X |

FOREIGN PATENTS 689,667  4/1953  Great Britain.

OTHER REFERENCES

Bjorksten Research Laboratories, Polyesters and Their Applications, Reinhold Publishing Corp., 1956, pp. 95, 107, 151, 186–187, 213.

ALEXANDER H. BRODMERKEL, *Primary Examiner.*

B. SNYDER, A. KOECKERT, *Assistant Examiners.*